(12) United States Patent  
Metka et al.

(10) Patent No.: US 11,939,005 B2  
(45) Date of Patent: Mar. 26, 2024

(54) DEPLOYABLE ACTIVE D-PILLAR SPOILER FOR VEHICLES

(71) Applicant: Honda Motor Co., Ltd., Tokyo (JP)

(72) Inventors: Matthew L. Metka, Plain City, OH (US); Pirooz Moradnia, Dublin, OH (US); David J. Rose, West Mansfield, OH (US); Benjamin Bowlby, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 17/533,417

(22) Filed: Nov. 23, 2021

(65) Prior Publication Data

US 2023/0159114 A1 May 25, 2023

(51) Int. Cl.  
*B62D 35/00* (2006.01)

(52) U.S. Cl.  
CPC .................................. *B62D 35/007* (2013.01)

(58) Field of Classification Search  
CPC ........ B62D 35/007; B62D 37/02; Y02T 10/82  
See application file for complete search history.

(56) References Cited

U.S. PATENT DOCUMENTS

| | | | |
|---|---|---|---|
| 6,886,882 B2 | 5/2005 | Farlow et al. | |
| 8,690,220 B2 | 4/2014 | Tsukiyama et al. | |
| 9,284,767 B2 | 3/2016 | Brandscheid et al. | |
| 9,802,657 B2 | 10/2017 | Oxley et al. | |
| 10,099,730 B1 | 10/2018 | Williams et al. | |
| 10,427,730 B2 | 10/2019 | Williams et al. | |
| 10,577,032 B2 | 3/2020 | Frederick et al. | |
| 10,875,588 B2 | 12/2020 | Welty et al. | |
| 2008/0301898 A1* | 12/2008 | Katou | B60S 1/0458 15/250.201 |
| 2019/0382063 A1 | 12/2019 | McAfee et al. | |
| 2020/0001935 A1 | 1/2020 | Nielsen et al. | |
| 2020/0369331 A1 | 11/2020 | Ferri et al. | |
| 2020/0391806 A1 | 12/2020 | Franke et al. | |
| 2020/0391811 A1 | 12/2020 | Han et al. | |
| 2020/0406991 A1 | 12/2020 | Povinelli et al. | |

(Continued)

FOREIGN PATENT DOCUMENTS

| | | |
|---|---|---|
| CN | 207916969 U | 9/2018 |
| DE | 102005050381 A1 | 4/2006 |
| DE | 102007032322 A1 | 1/2009 |

(Continued)

*Primary Examiner* — Lori Lyjak  
(74) *Attorney, Agent, or Firm* — Plumsea Law Group, LLC

(57) ABSTRACT

A system for deploying D-pillar spoilers on a vehicle is described. The system includes a deployment control system including controller logic having at least one processor and a memory storing instructions for implementing deployment and retraction of D-pillar spoilers on a vehicle. The system also includes at least one vehicle sensor in communication with the deployment control system. The system further includes a motor in communication with the deployment control system. At least one D-pillar spoiler is connected to the motor through a linkage, where the motor is configured to rotate the linkage. The at least one D-pillar spoiler is folded along an underside of a rear upper spoiler of the vehicle in a retracted position and is rotated to a position extending between the rear upper spoiler of the vehicle and a D pillar of the vehicle in a deployed position.

20 Claims, 13 Drawing Sheets

(56) References Cited

U.S. PATENT DOCUMENTS

2023/0069045 A1* 3/2023 Rose .................... B62D 35/007
2023/0089642 A1* 3/2023 Metka ................... B62D 37/02
                                                    296/180.1

FOREIGN PATENT DOCUMENTS

| DE | 102011011102 A1 | 1/2012 | | |
|----|-----------------|--------|---|---|
| DE | 102018209474 A1 | 12/2019 | | |
| EP | 3789276 A1 * | 3/2021 | ........... | B62D 35/007 |
| FR | 2854858 B1 | 6/2006 | | |
| FR | 2854860 B1 | 6/2006 | | |
| FR | 2888199 B1 | 8/2007 | | |
| FR | 2892994 B1 | 2/2008 | | |
| FR | 2896759 B1 | 4/2008 | | |
| FR | 2909176 B1 | 2/2009 | | |
| FR | 2892993 B1 | 4/2009 | | |
| FR | 3060513 B1 | 10/2019 | | |
| WO | 2005105555 A1 | 11/2005 | | |
| WO | 2007138212 A1 | 12/2007 | | |
| WO | 2019129836 A1 | 7/2019 | | |
| WO | 2020023868 A1 | 1/2020 | | |
| WO | 2020219438 A1 | 10/2020 | | |

* cited by examiner

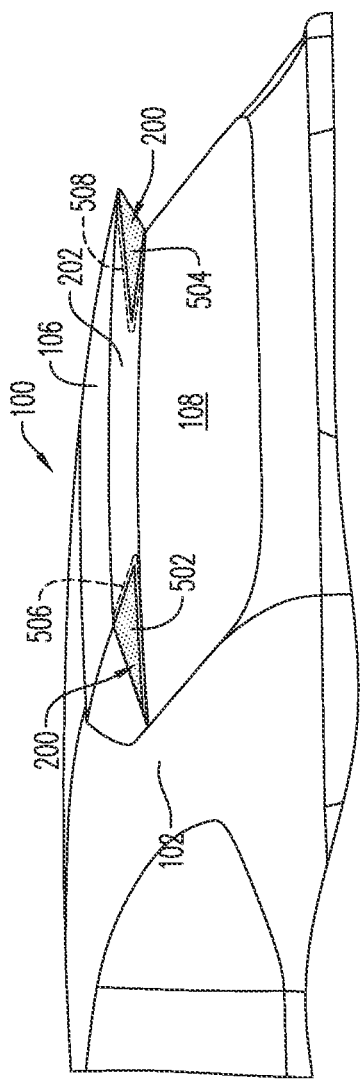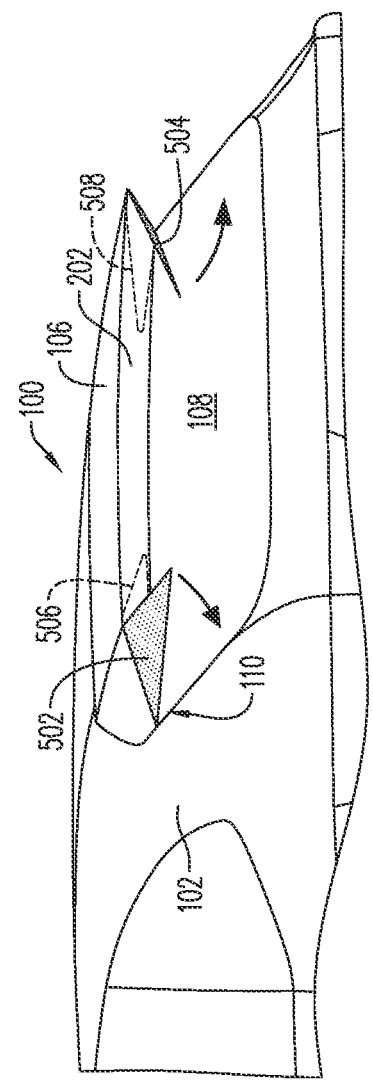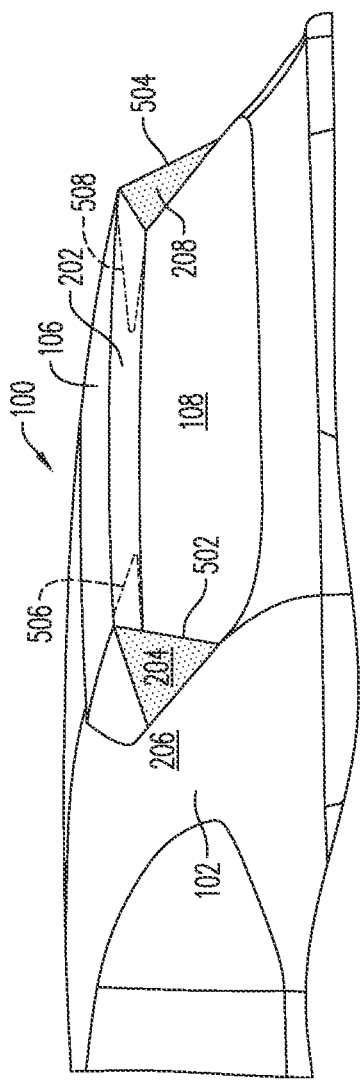

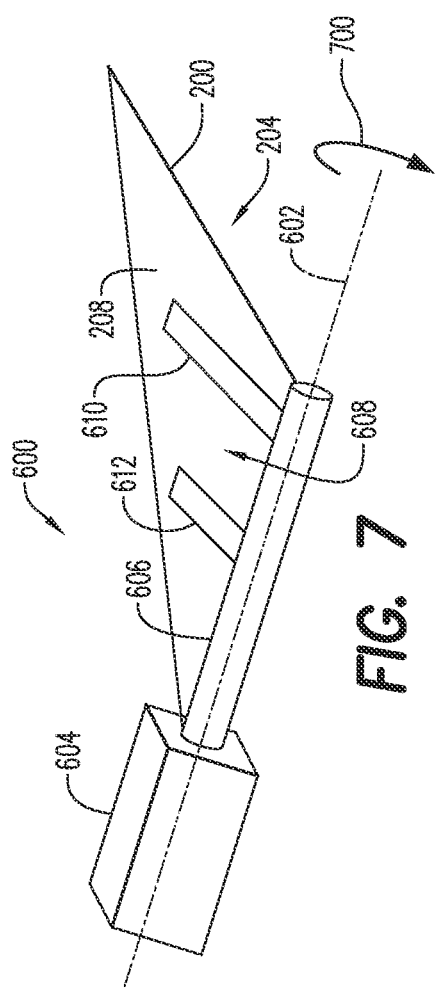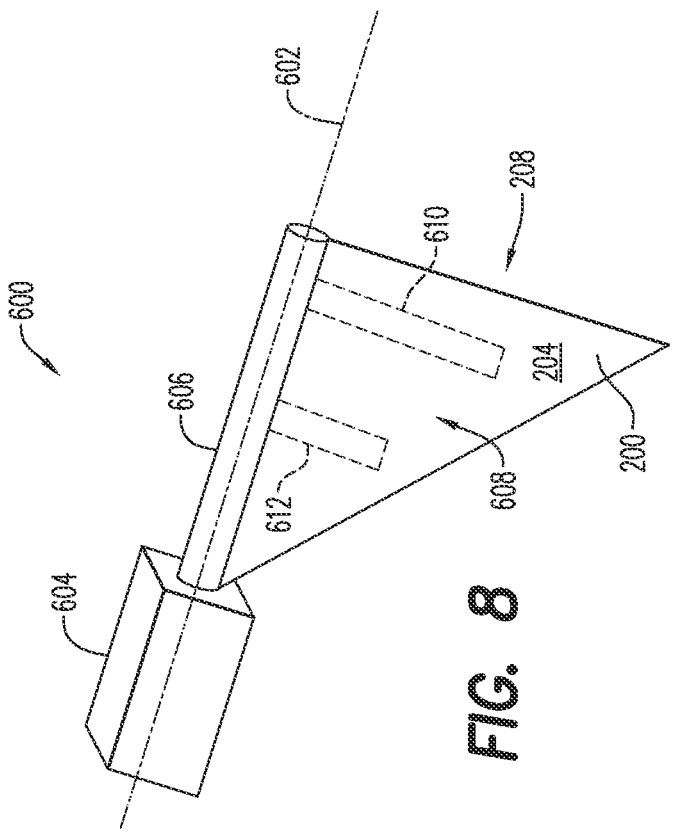

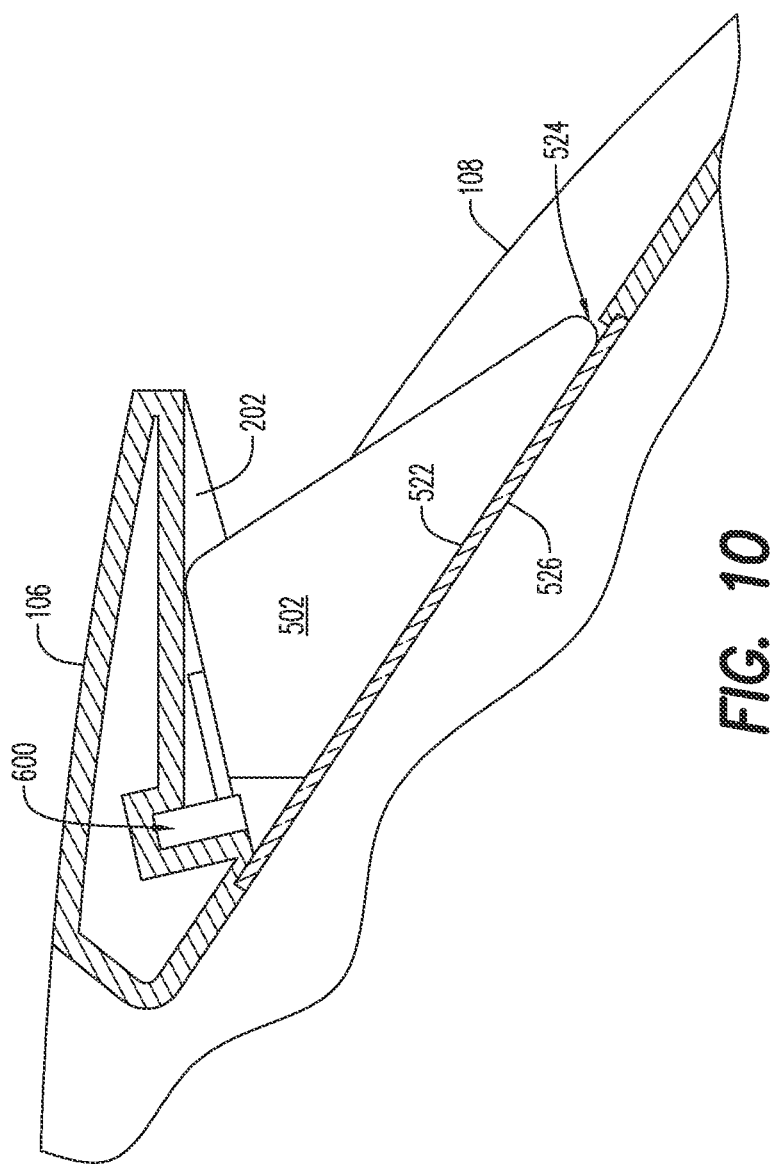

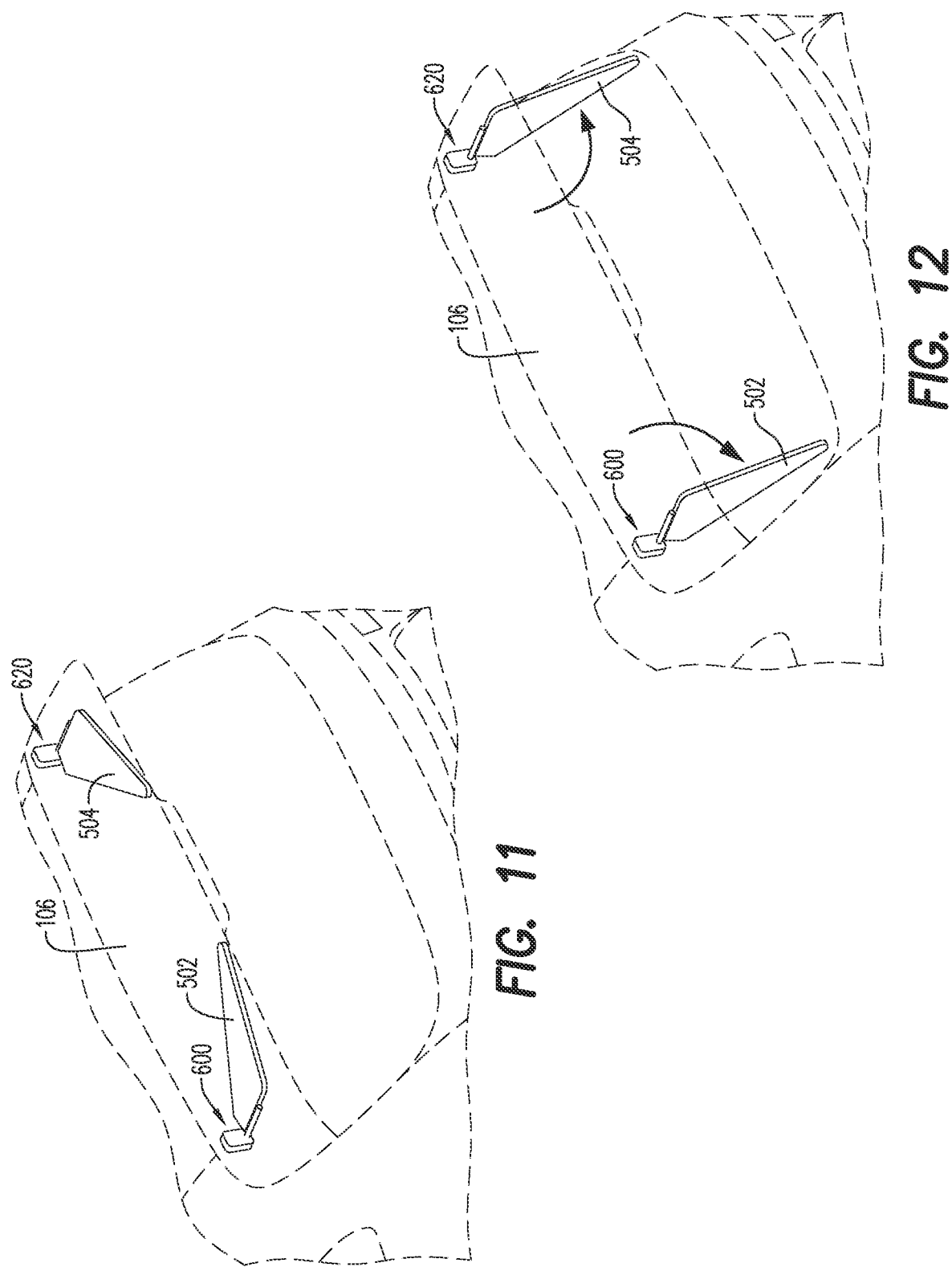

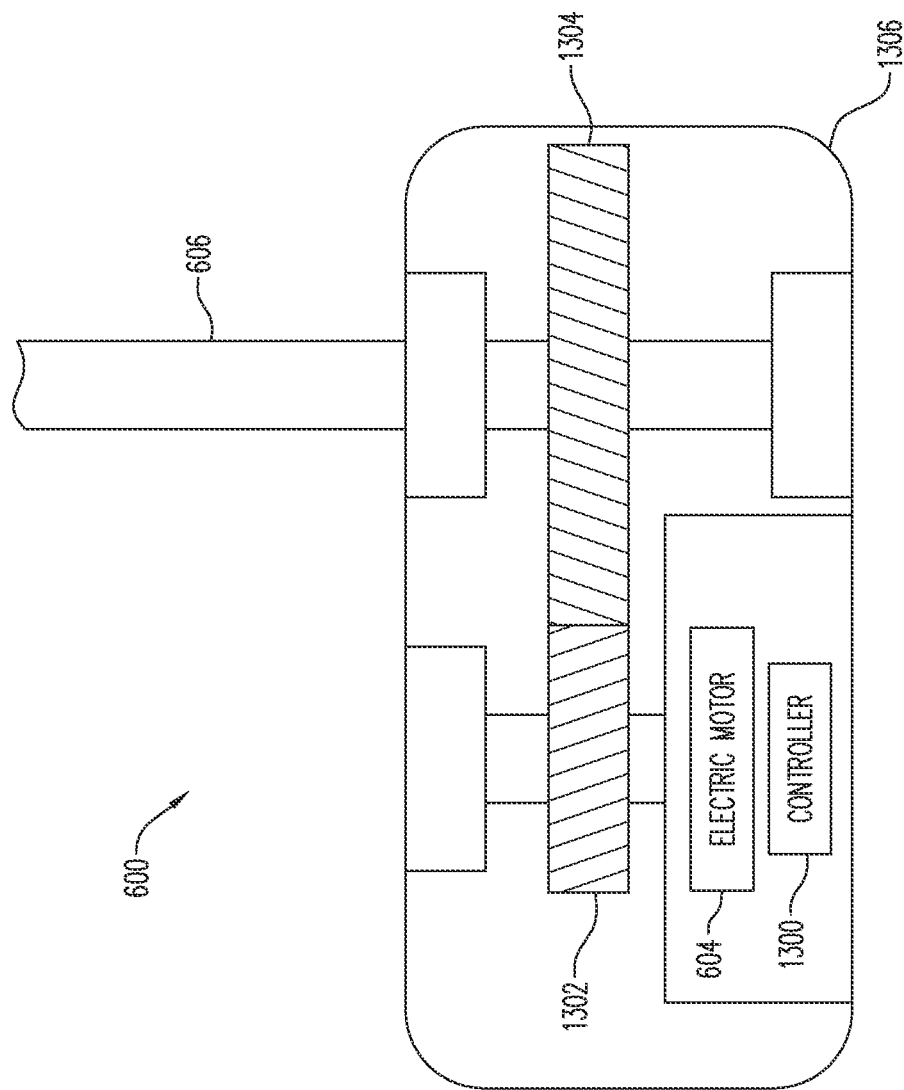

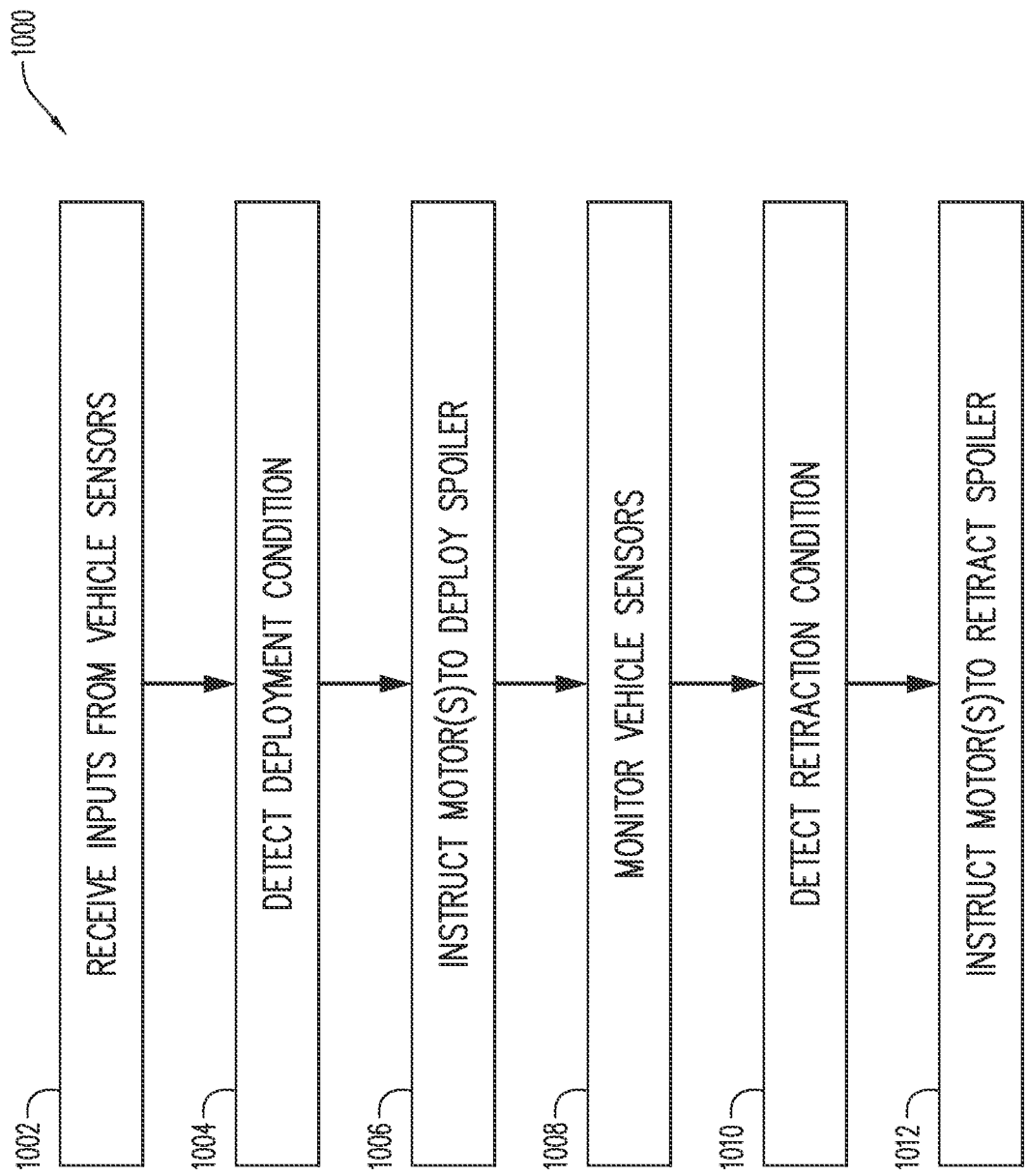

DEPLOYABLE ACTIVE D-PILLAR SPOILER FOR VEHICLES

BACKGROUND

The present disclosure generally relates to structures and systems for manipulating airflow around a vehicle, and, more particularly, to deployable active D-pillar spoilers which are deployed to improve aerodynamic performance while the vehicle is moving at a predetermined speed and are retracted when the vehicle is parked or operating at low speeds to improve styling appearance.

There is a need in the art for a system that improves the aerodynamic performance of a vehicle without detracting from the outer appearance of the vehicle while stopped or operating at lower speeds.

SUMMARY

In one aspect, a rear spoiler for a vehicle is provided. The rear spoiler includes a spoiler body having a first end on one side of the vehicle and a second end on the opposite side of the vehicle. The spoiler body is positioned at a rearward end of the vehicle with the first end positioned adjacent to a first rear pillar of the vehicle and the second end positioned adjacent to a second rear pillar of the vehicle. The rear spoiler also includes an underside of the spoiler body extending between the first end and the second end and at least one active spoiler disposed beneath the spoiler body. The at least one active spoiler is movable between a stowed position and a deployed position. In the stowed position, the at least one active spoiler is disposed adjacent to the underside of the spoiler body, and, in the deployed position, a first end of the at least one active spoiler is positioned adjacent to the first end of the spoiler body and a second end of the at least one active spoiler extends downwards from the spoiler body.

In another aspect, a system for deploying D-pillar spoilers on a vehicle is provided. The system includes a deployment control system including controller logic having at least one processor and a memory storing instructions for implementing deployment and/or retraction of one or more D-pillar spoilers on a vehicle. The system also includes at least one vehicle sensor in communication with the deployment control system. The system further includes a motor in communication with the deployment control system. At least one D-pillar spoiler is connected to the motor through a linkage, where the motor is configured to rotate the linkage. The at least one D-pillar spoiler is folded along an underside of a rear upper spoiler of the vehicle in a retracted position and is rotated to a position extending between the rear upper spoiler of the vehicle and a D pillar of the vehicle in a deployed position.

In another aspect, an apparatus for deploying a D-pillar spoiler of a vehicle is provided. The apparatus includes a motor and a linkage connected to the motor such that the motor is configured to rotate the linkage in a first direction and a second direction that is opposite the first direction. The apparatus also including at least one support member attached to the linkage at one end and a D-pillar spoiler connected to the at least one support member along an inner surface of the D-pillar spoiler. The D-pillar spoiler is folded along an underside of a rear upper spoiler of the vehicle in a retracted position and is rotated by the motor to a position extending between the rear upper spoiler of the vehicle and a D pillar of the vehicle in a deployed position.

In another aspect, a method of deploying D-pillar spoilers on a vehicle is provided. The method includes receiving, at a processor of a controller logic of a deployment control system, a speed of the vehicle from a vehicle speed sensor. The method also includes determining whether the vehicle speed is greater than or equal to a predetermined speed. Upon determining that the vehicle speed is greater than or equal to the predetermined speed, the method further includes sending an instruction to a motor to rotate in a first direction to rotate at least one D-pillar spoiler from a retracted position folded along an underside of a rear upper spoiler of the vehicle to a deployed position extending between the rear upper spoiler of the vehicle and a D pillar of the vehicle.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 5A is a representative view of an example embodiment of a deployable active D-pillar spoiler transitioning between a retracted position to a deployed position in accordance with aspects of the present disclosure;

FIG. 5B is a representative view of an example embodiment of a deployable active D-pillar spoiler in the process of transitioning between a retracted position to a deployed position in accordance with aspects of the present disclosure;

FIG. 5C is a representative view of an example embodiment of a deployable active D-pillar spoiler that has transitioned from a retracted position to a deployed position in accordance with aspects of the present disclosure;

FIG. 7 is an enlarged view of an example embodiment of a deployment mechanism for a deployable active D-pillar spoiler in a retracted position in accordance with aspects of the present disclosure;

FIG. 8 is an enlarged view of an example embodiment of a deployment mechanism for a deployable active D-pillar spoiler rotating into a deployment position in accordance with aspects of the present disclosure;

FIG. 10 is a cross-sectional side view of the alternate embodiment of a deployable active D-pillar spoiler in accordance with aspects of the present disclosure;

FIG. 11 is an alternate embodiment of a deployable active D-pillar spoiler in a retracted position in accordance with aspects of the present disclosure;

FIG. 12 is the alternate embodiment of a deployable active D-pillar spoiler that has transitioned from the retracted position to a deployed position in accordance with aspects of the present disclosure;

FIG. 13 is a representative view of an example embodiment of a deployment mechanism in accordance with aspects of the present disclosure;

FIG. 15 is a flowchart of an example embodiment of a method for controlling deployment of a deployable active D-pillar spoiler in accordance with aspects of the present disclosure.

DETAILED DESCRIPTION

The deployable active D-pillar spoilers according to the example embodiments described herein are deployed while the vehicle is moving at or above a first predetermined speed to improve aerodynamic performance and are retracted or stowed when the vehicle is parked or operating at low speeds (i.e., at or below a second predetermined speed) to improve styling appearance. The deployable active D-pillar spoilers disclosed herein offer additional benefits over fixed spoilers because they allow a cleaner aesthetic appearance when the vehicle is parked or being driven at low speeds and, once deployed at the first predetermined speed, reduce aerodynamic drag to provide improved aerodynamic performance.

Figure 1:
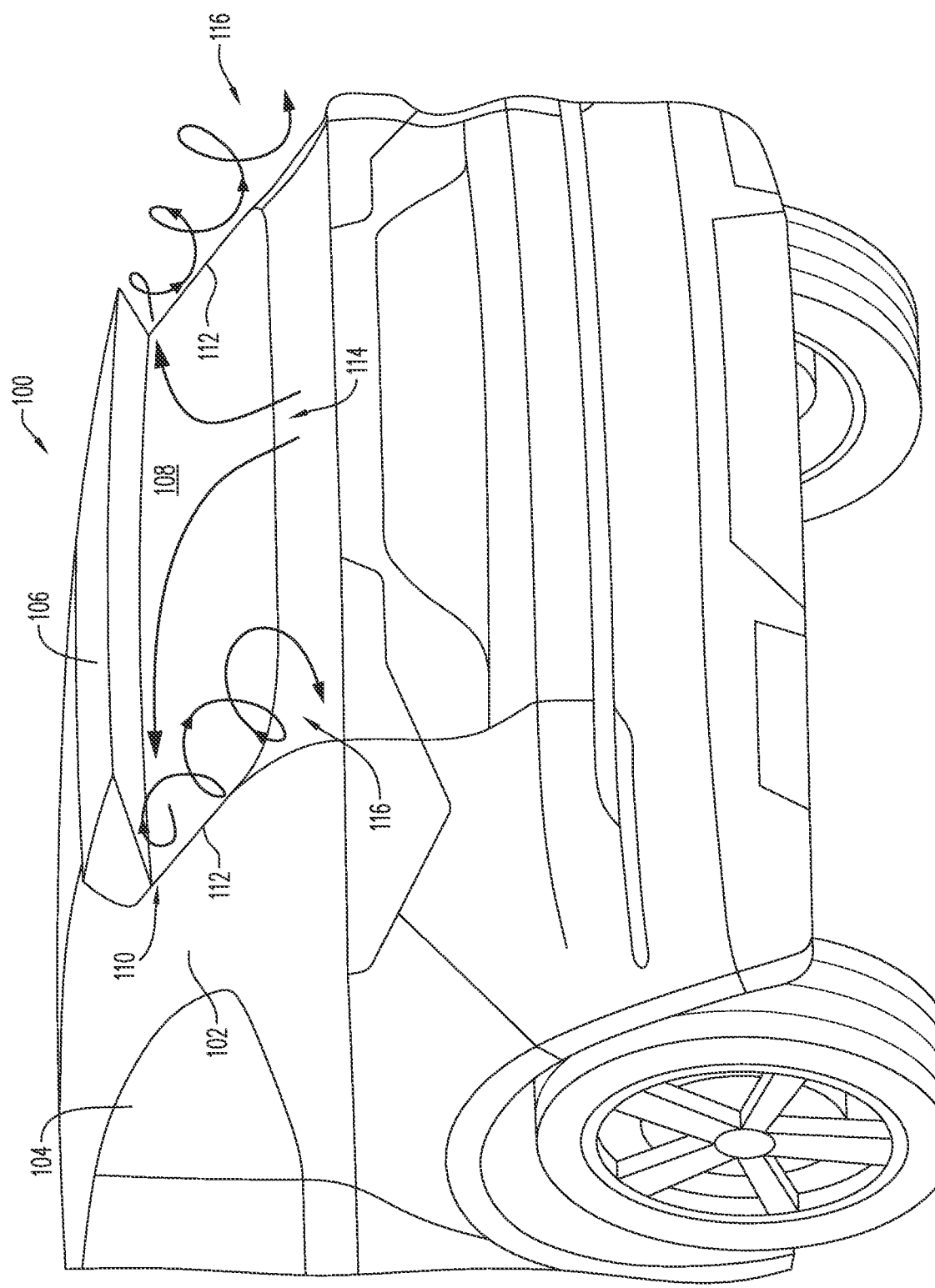
FIG. 1 is a representative view of an example embodiment of a deployable active D-pillar spoiler in a retracted position in accordance with aspects of the present disclosure.

Referring now to FIG. 1, a vehicle 100 on which example embodiments of deployable active D-pillar spoilers may be installed is shown. In an example embodiment, vehicle 100 is a sport utility vehicle (SUV), however, it should be understood that the example embodiments may be used with any type of vehicle having a D pillar support and a rear spoiler extending rearward from the top of the D-pillar support. A D pillar is a vertical or near vertical support structure located at the rearmost portion of the vehicle body behind the rear doors of the vehicle. In contrast, the vehicle's A pillar is located on either side of the vehicle's windshield, the B pillar is located between the front doors and rear doors, and the C pillar is located directly behind the rear doors. The D pillar is located further towards the rear of the vehicle than the C pillar. D pillars are most commonly found on SUVs, minivans, and/or station wagon types of vehicles.

In this embodiment, vehicle 100 includes a D pillar 102 located at the rear of vehicle 100 behind a rear side window 104 on one side of vehicle 100. While not shown in this embodiment, vehicle 100 also includes a corresponding D pillar located on the opposite side of vehicle 100. In an example embodiment, vehicle 100 also includes a rear upper spoiler 106 located above a rear window 108 of vehicle 100. Rear upper spoiler 106 includes a spoiler body that extends between a first end on one side of vehicle 100 and a second end at the opposite side of vehicle 100. In some cases, rear upper spoiler 106 may have an upper surface that is continuous with an upper surface of a roof of vehicle 100. That is, the upper surface of rear upper spoiler 106 and the upper surface of the roof of vehicle 100 may form an uninterrupted uniform surface on the top of vehicle 100.

As shown in FIG. 1, the deployable active D-pillar spoilers of the present embodiments are in a stowed or retracted position located on the underside of rear spoiler 106. In an example embodiment, open area 110 formed on either side of the rear of vehicle 100 between rear spoiler 106 and a trailing edge 112 of D pillar 102 (or the associated side panel) running along the perimeter of rear window 108 may cause higher aerodynamic drag for vehicle 100. For example, reverse air flow 114 on rear window 108 while vehicle 100 is moving may interact with the corner vertex of open area 110 (i.e., the point where rear spoiler 106 and D pillar 102 meet) to create end vortices 116 of air that reduce the overall effectiveness and/or aerodynamic performance of rear spoiler 106.

Figure 2:
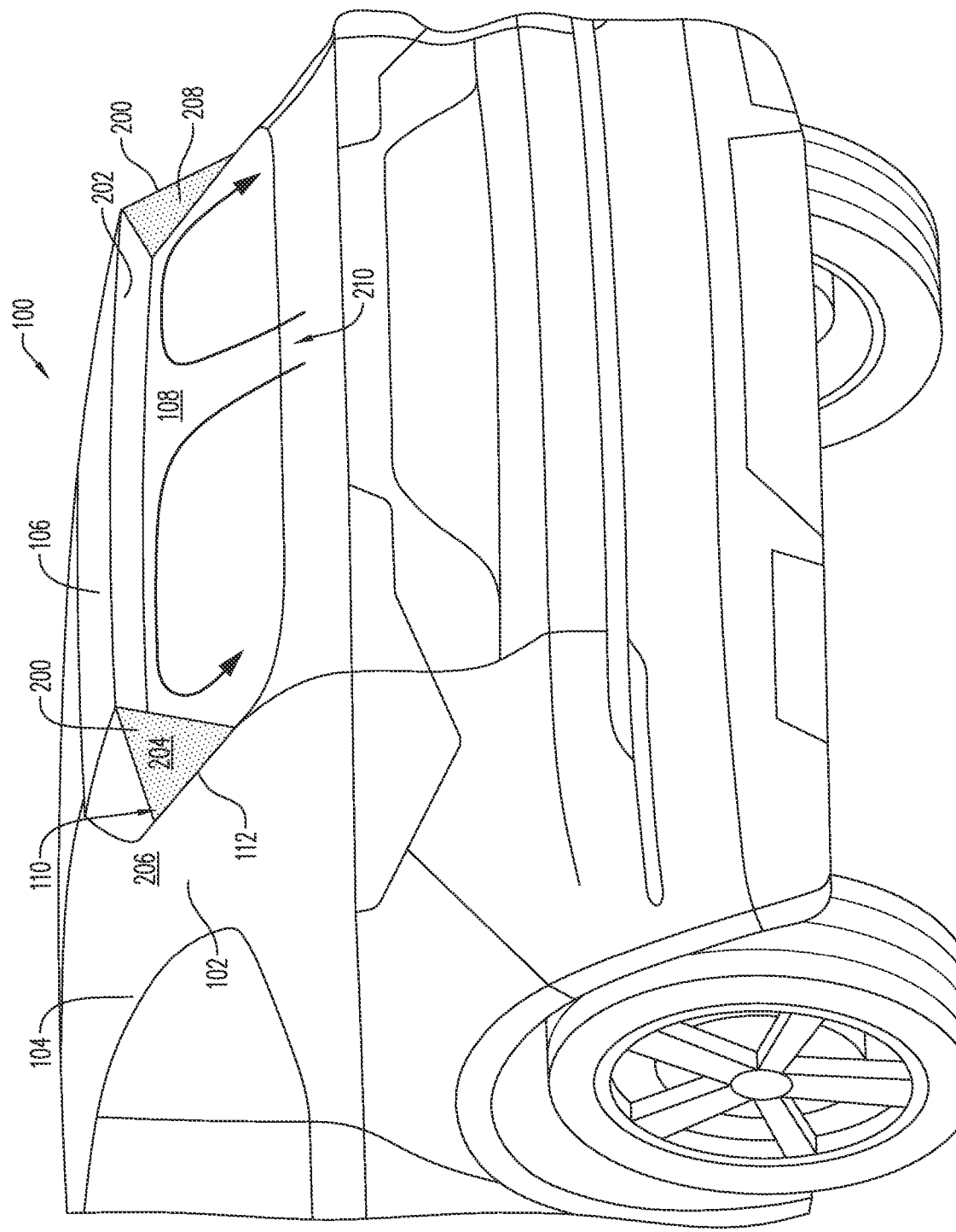
FIG. 2 is a representative view of an example embodiment of a deployable active D-pillar spoiler in a deployed position in accordance with aspects of the present disclosure.

Referring now to FIG. 2, the deployable active D-pillar spoilers of the present embodiments are shown in a deployed position. In this embodiment deployable active D-pillar spoilers 200 (also referred to herein as "D-pillar spoilers 200") are shown disposed within open area 110 on either side of the rear of vehicle 100 between rear spoiler 106 and trailing edge 112 of D pillar 102 running along the perimeter of rear window 108. As shown in FIG. 2, vehicle 100 includes two D-pillar spoilers 200, one on each side of vehicle 100.

In an example embodiment, D-pillar spoilers 200 are deployed from the stowed or retracted position located on an underside 202 of rear spoiler 106 to the deployed position shown in FIG. 2. For example, in some embodiments, D-pillar spoilers 200 are deployed using a deployment mechanism (described below) that is configured to rotate or pivot the D-pillar spoilers 200 from the stowed or retracted position on underside 202 of rear spoiler 106 to the deployed position at trailing edge 112 of D pillar 102 in response to vehicle 100 reaching a predetermined speed. In other embodiments, the deployment mechanism may be configured to translate the D-pillar spoilers 200 outwards and then rotate or pivot the D-pillar spoilers 200 downward to the deployed position. In still other embodiments, the deployment mechanism may be configured to translate the D-pillar spoilers 200 longitudinally rearward from the D-pillar 102. In additional other embodiments, the deployment mechanism may be configured to rotate the D-pillar spoilers 200 downward about a pivot or rotation axis that is approximately aligned along a transverse direction of vehicle 100 (e.g., from a left side to a right side of vehicle 100).

In an example embodiment, an outer surface 204 of each D-pillar spoiler 200 is substantially continuous or uninterrupted with a side surface 206 of D pillar 102 of vehicle 100 on each side when D-pillar spoilers 200 are in the deployed position. Inner surfaces 208 of D-pillar spoilers 200 (disposed on the opposite side from outer surface 204) face inwards towards each other and rear window 108. D-pillar spoilers 200 act as an extension of side surface 206 and rear upper spoiler 106 to assist with attenuating and redirecting the airstream caused by airflows on rear window 108 and may further act to reduce vortices extending from the tip or edge of rear upper spoiler 106 (e.g., end vortices 116, shown in FIG. 1).

For example, as shown in FIG. 2, rear airflow 210 travels upwards towards rear upper spoiler 106 and D-pillar spoilers 200 and is directed back downwards in a smooth manner without creating end vortices 116, as in FIG. 1. Additionally, D-pillar spoilers 200 provide increased air pressure on rear window 108 by containing and recirculating the airflows on rear window 108 backwards instead of allowing the airflows to leak outwards at open area 110. This configuration acts to improve overall aerodynamic performance by reducing aerodynamic drag on vehicle 100 as it is moving at or above the predetermined speed at which the D-pillar spoilers 200 are deployed. With this arrangement, D-pillar spoilers 200 provide aesthetically pleasing styling under parked and low speed conditions, while also providing improved aerodynamic performance at high speeds (e.g., at or above the predetermined speed, as will be described below).

In an example embodiment, D-pillar spoilers 200 may in the form of a panel having a triangular shape configured to fit or fill in open area 110 between rear upper spoiler 106 and trailing edge 112 of D pillar 102. In other embodiments, the shape of the panel may vary, depending on the shape and/or configuration of the D pillar and rear upper spoiler on the vehicle. In different embodiments, the panel forming D-pillar spoilers 200 may be made from a variety of materials, including, but not limited to: solid materials, such as metal, carbon fiber, fiberglass, or rigid plastic, flexible materials, such as fabrics, rubber, or bendable plastics, and/or combinations thereof.

Figure 3:
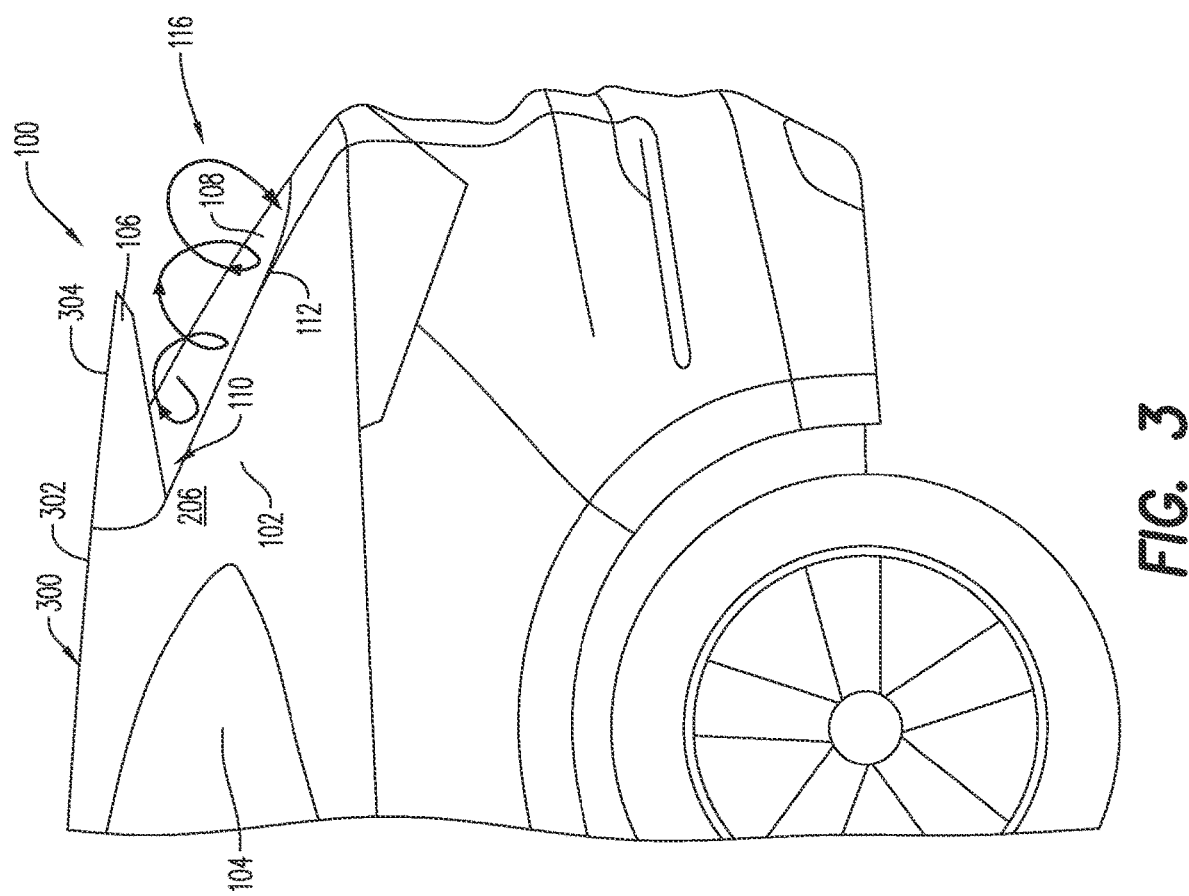
FIG. 3 is a side view of an example embodiment of a deployable active D-pillar spoiler in a retracted position in accordance with aspects of the present disclosure.

Referring now to FIG. 3, a side view of vehicle 100 with deployable active D-pillar spoilers 200 in the stowed or retracted position is shown. As shown in this embodiment, a roof 300 of vehicle 100 has an upper surface 302 that is continuous with an upper surface 304 of rear upper spoiler 106 so as to form an uninterrupted uniform surface on the top of vehicle 100. When D-pillar spoilers 200 are in the stowed or retracted position on the underside of rear upper spoiler 106, open area 110 where rear upper spoiler 106 intersects or meets with trailing edge 112 of D pillar 102 running along the perimeter of rear window 108 allow airflows across rear window 108 to exit along either side and the tip or edge of rear upper spoiler 106 can create end vortices 116 of air that cause higher aerodynamic drag for vehicle 100 and reduce the overall effectiveness and/or aerodynamic performance of rear spoiler 106.

Figure 4:
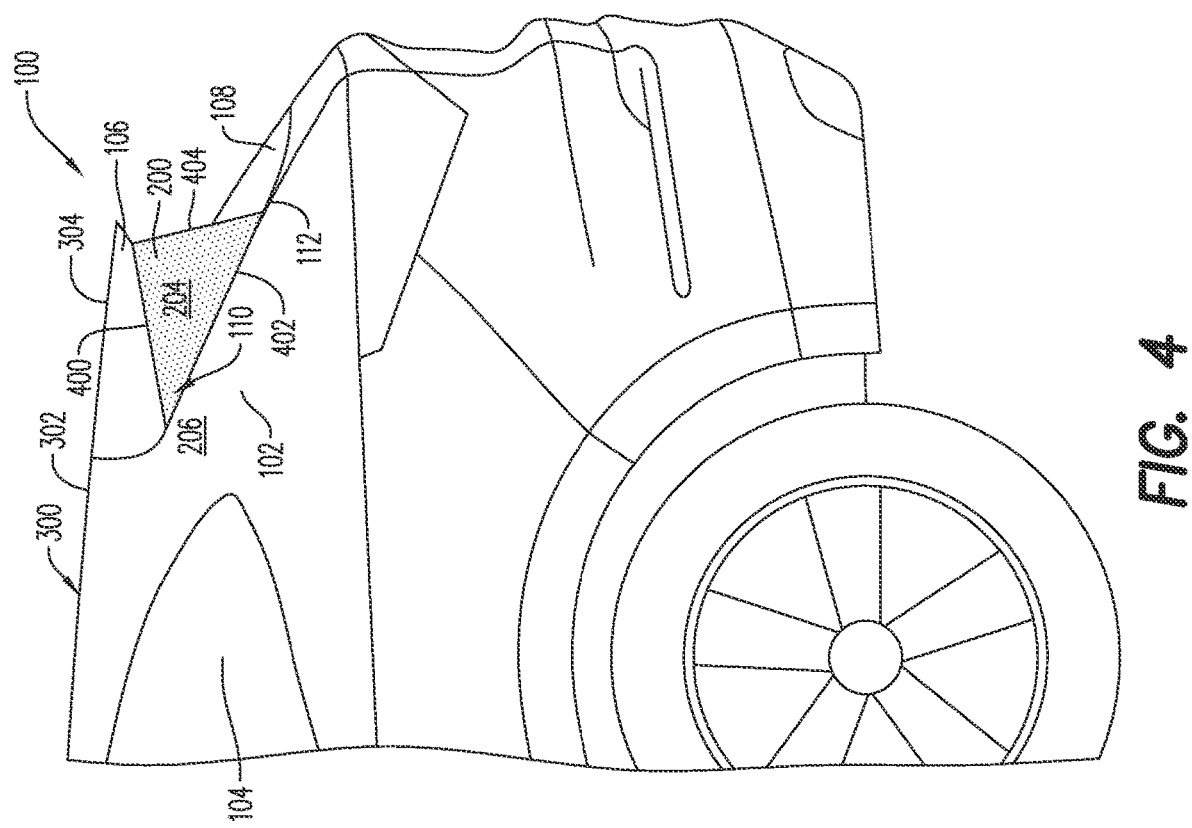
FIG. 4 is a side view of an example embodiment of a deployable active D-pillar spoiler in a deployed position in accordance with aspects of the present disclosure.

Referring now to FIG. 4, a side view of vehicle 100 with deployable active D-pillar spoilers 200 in a deployed position is shown. In example embodiments, D-pillar spoilers 200 are located within open area 110 on either side of the rear of vehicle 100 between rear spoiler 106 and trailing edge 112 of D pillar 102 running along the perimeter of rear window 108. In this embodiment, D-pillar spoiler 200 includes a top edge 400 that is configured to contact or be disposed adjacent to a bottom edge of the underside of rear upper spoiler 106. D-pillar spoiler 200 also includes a bottom edge 402 that is configured to contact or be disposed adjacent to trailing edge 112 of D pillar 102. D-pillar spoiler 200 also includes a rear edge 404 that extends from the underside of rear upper spoiler 106 towards trailing edge 112 of D pillar 102. With this configuration, top edge 400, bottom edge 402, and rear edge 404 of D-pillar spoiler 200 form the triangular shape of D-pillar spoiler 200.

In some embodiments, edges of D-pillar spoiler 200 may be arranged so as to be flush with the other vehicle body components, including top edge 400 being flush along the bottom edge of the underside of rear upper spoiler 106 and bottom edge 402 being flush along trailing edge 112 of D pillar 102. In other embodiments, small gaps or spaces may be provided between the edges of D-pillar spoiler 200 and the vehicle body components, for example, on the order of several millimeters (e.g., 2-5 mm) to allow for manufacturing tolerances and other margins.

As shown in FIG. 4, rear edge 404 of D-pillar spoiler is approximately aligned with a rear lip 406 of rear upper spoiler 106. That is, the dimensions of D-pillar spoiler 200 are configured so as to fill in open area 110 formed between the underside of rear upper spoiler 106 and trailing edge 112 of D pillar 102. For example, in one embodiment, top edge 400 may have a substantially similar length as the length of the portion of rear upper spoiler 106 that extends over rear window 108 (e.g., approximately 300 mm). However, in other embodiments, the dimensions of D-pillar spoiler 200 may vary. For example, in some cases, top edge 400 of D-pillar spoiler 200 may extend past rear lip 406 of rear upper spoiler 106 so that top edge 400 of D-pillar spoiler 200 has a length that is greater than the length of rear upper spoiler 106. In other cases, top edge 400 of D-pillar spoiler 200 may be shorter than rear lip 406 of rear upper spoiler 106 so that top edge 400 of D-pillar spoiler 200 has a length that is less than the length of rear upper spoiler 106. It should be understood that the dimensions of D-pillar spoiler 200 may scale with the size and dimensions of rear upper spoiler 106.

In some embodiments, the deployable active D-pillar spoilers according to the example embodiments described herein are deployed while the vehicle is moving at a predetermined speed to improve aerodynamic performance. Referring now to FIGS. 5A-5C, views of example embodiments of deployable active D-pillar spoilers being deployed are shown. FIG. 5A illustrates D-pillar spoilers 200 in a retracted or stowed position on an underside 202 of rear upper spoiler 106. For example, D-pillar spoilers 200 may be in the retracted or stowed positions when vehicle 100 is parked or when moving at speeds less than the predetermined speed at which D-pillar spoilers are to be deployed.

In this embodiment, each individual D-pillar spoiler, including a first D-pillar spoiler 502 on one side of vehicle 100 and a second D-pillar spoiler 504 on the opposite side of vehicle 100, are folded approximately flat to underside 202 of rear upper spoiler 106 in their retracted or stowed positions. That is, in the retracted or stowed position, first D-pillar spoiler 502 and second D-pillar spoiler 504 are arranged underneath rear upper spoiler 106 such that the inner surfaces (e.g., inner surface 208, shown in FIG. 2) of each individual D-pillar spoiler are approximately parallel to the surface of underside 202 of rear upper spoiler 106.

In some embodiments, underside 202 of rear upper spoiler 106 may include corresponding flat portions or areas on either side that are configured to receive each D-pillar spoiler in the retracted or stowed position. For example, in this embodiment, first D-pillar spoiler 502 is folded flat along a first area 506 on underside 202 and second D-pillar spoiler 504 is folded flat along a second area 508 on underside 202. In an example embodiment, each flat area (e.g., first area 506 and second area 508) has a shape and size that corresponds to the shape and size of the respective D-pillar spoiler. For example, first area 506 has shape and size that corresponds to the size and shape of first D-pillar spoiler 502 and second area 508 has a size and shape that corresponds to second D-pillar spoiler 504. With this arrangement, D-pillar spoilers 200, including first D-pillar spoiler 502 and second D-pillar spoiler 504, may be hidden or minimally visible when in the retracted or stowed position so as to provide aesthetically pleasing styling under parked and low speed conditions.

Next, FIG. 5B illustrates D-pillar spoilers 200, including first D-pillar spoiler 502 and second D-pillar spoiler 504, in an intermediate position between the retracted or stowed position of FIG. 5A and a fully deployed position shown in FIG. 5C. For example, once vehicle 100 reaches a deployment condition, which may be based on a predetermined speed, as well as other factors, as will be described below, each of first D-pillar spoiler 502 and second D-pillar spoiler 504 are instructed to deploy from the retracted or stowed position to the deployed position. In an example embodiment, first D-pillar spoiler 502 and second D-pillar spoiler 504 rotate or pivot outward from underside 202 of rear upper spoiler 106 towards open area 110 formed between rear upper spoiler 106 and D pillar 102. As shown in FIG. 5B, first D-pillar spoiler 502 and second D-pillar spoiler 504 are illustrated rotating or pivoting from the retracted or stowed position to the deployed position.

FIG. 5C illustrates D-pillar spoilers 200, including first D-pillar spoiler 502 and second D-pillar spoiler 504, in their deployed positions on either side of vehicle 100. In this embodiment, each of first D-pillar spoiler 502 and second D-pillar spoiler 504 has been rotated or pivoted by a deployment mechanism (described below) that transitions each D-pillar spoiler from underside 202 of rear upper spoiler 106 to an upright position filling in open area 110 on either side of vehicle 100 so that outer surface 204 of each D-pillar spoiler is substantially continuous or uninterrupted with side surface 206 of D pillar 102 of vehicle 100 on each side. With this arrangement, D-pillar spoilers 200, including first D-pillar spoiler 502 and second D-pillar spoiler 504, provide improved aerodynamic performance to vehicle 100 in their deployed positions.

Figure 6:
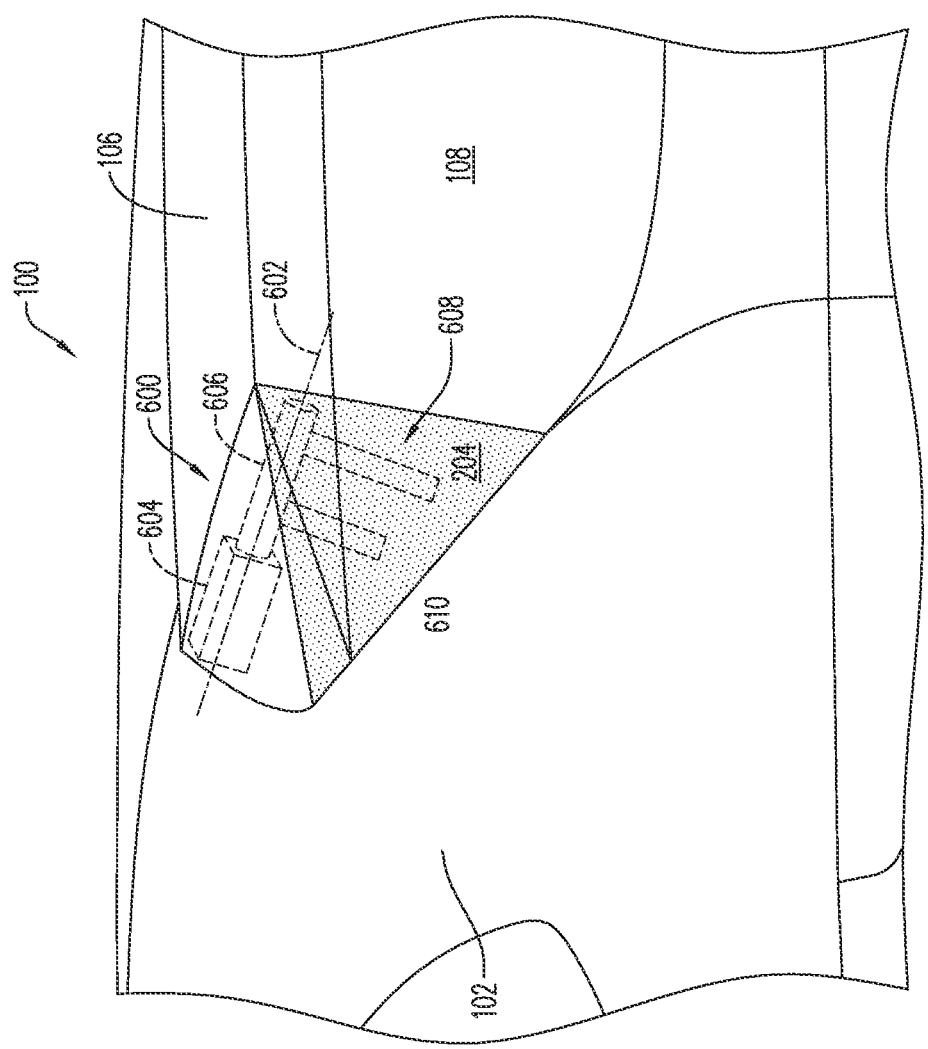
FIG. 6 is a schematic view of an example embodiment of a deployment mechanism for a deployable active D-pillar spoiler in accordance with aspects of the present disclosure.

Referring now to FIGS. 6-8, a deployment mechanism 600 configured to move or transition D-pillar spoilers 200 between the retracted or stowed position and the deployed position is shown. In an example embodiment, each individual spoiler of D-pillar spoilers 200 may be associated with a separate deployment mechanism 600 that is configured to rotate or pivot the spoiler between the retracted or stowed position and the deployed position. In other embodiments, both D-pillar spoilers 200 on each side of vehicle 100 may be deployed and/or retracted using a single deployment mechanism. For example, a single deployment mechanism may be connected to both D-pillar spoilers using linkages and other mechanisms to deploy and/or retract both D-pillar spoilers in unison.

In this embodiment, deployment mechanism 600 is located within rear upper spoiler 106 and arranged with a pivot or rotation axis 602 that is approximately aligned along a longitudinal direction of vehicle 100 (e.g., from the front end to the rear end of vehicle 100). In some embodiments, pivot or rotation axis 602 may also be angled slightly downwards away from the roof of vehicle 100. In further embodiments, pivot or rotation axis 602 may also be angled slightly inwards or outwards with respect to a longitudinal centerline of vehicle 100.

In an example embodiment, deployment mechanism 600 includes a motor 604 configured to rotate or turn a linkage 606 that is connected or attached to D-pillar spoilers 200 by one or more support members 608. By action of motor 604 rotating or turning linkage 606, D-pillar spoilers 200 may be rotated or pivoted between the retracted or stowed position and the deployed position. In this embodiment, support members 608 include a first member 610 and a second member 612 connected or attached to inner surface 208 of D-pillar spoilers 200 (i.e., on the back side of D-pillar spoilers 200 opposite outer surface 204). Support members 608, including first member 610 and second member 612, are approximately perpendicular to linkage 606 so as to translate the rotational movement of linkage 606 from motor 604 to the pivoting or rotating motion that transitions D-pillar spoilers 200 between the retracted or stowed position and the deployed position.

In this embodiment, support members 608 include two support members (e.g., first member 610 and second member 612). In other embodiments, support members 608 may include a larger or smaller number of support members. For example, in some cases, more support members may be used based on the type of material used to form the panel of D-pillar spoilers 200. In addition, in cases where the material used to form the panel of D-pillar spoilers 200 is a flexible material (including, for example, fabric), support members 608 may include a frame or other structure that defines a perimeter of the D-pillar spoiler 200 to provide its triangular shape.

Referring now to FIG. 7, an enlarged view of an example embodiment of deployment mechanism 600 for rotating or pivoting deployable active D-pillar spoilers 200 is shown with a representative D-pillar spoiler 200 in a retracted or stowed position. In this embodiment, D-pillar spoiler 200 is shown in the retracted or stowed position such that inner surface 208 (i.e., on an opposite side from outer surface 204) is facing upwards (e.g., towards underside 202 of rear upper spoiler 106, as shown in previous Figures). Support members 608, including first member 610 and second member 612, are shown attached or connected to D-pillar spoiler 200 on inner surface 208. For example, one side of each of first member 610 and second member 612 is attached to inner surface 208 along the entire length of first member 610 and second member 612. Additionally, first member 610 and second member 612 are connected to linkage 606 at one end so that first member 610 and second member 612 rotate or turn along with linkage 606 when driven by motor 604.

In this embodiment, motor 604 of deployment mechanism 600 rotates or turns linkage in a clockwise direction 700 to cause D-pillar spoiler to pivot or rotate from the retracted or stowed position to the deployed position. Similarly, reverse motion by motor 604 drives linkage 606 in a counter-clockwise direction to cause D-pillar spoiler to pivot or rotate back from the deployed position to the retracted or stowed position.

Referring now to FIG. 8, an enlarged view of deployment mechanism 600 for rotating or pivoting deployable active D-pillar spoilers 200 is shown with representative D-pillar spoiler 200 in a deployed position. In this embodiment, motor 604 of deployment mechanism 600 has rotated or turned linkage in a clockwise direction to cause D-pillar spoiler to pivot or rotate from the retracted or stowed position to the deployed position shown in FIG. 8. In this embodiment, outer surface 204 of D-pillar spoiler 200 is facing outwards away from vehicle 100, as shown in the previous Figures. In one embodiment, motor 604 rotates or turns linkage 606 to pivot or rotate D-pillar spoiler 200 approximately 90 degrees from the retracted or stowed position to the deployed position. In some cases, D-pillar spoiler 200 may be rotated or pivoted more or less than 90 degrees (e.g., in a range between 80-110 degrees) in order to reach and fill open area 110 between rear upper spoiler 106 and trailing edge 112 of D pillar 102 of vehicle 100. For example, the amount of rotation may depend on the shape and slope of the vehicle body components, including but not limited to the D-pillar, rear window, and/or rear upper spoiler configurations on any given vehicle.

Figure 9A:
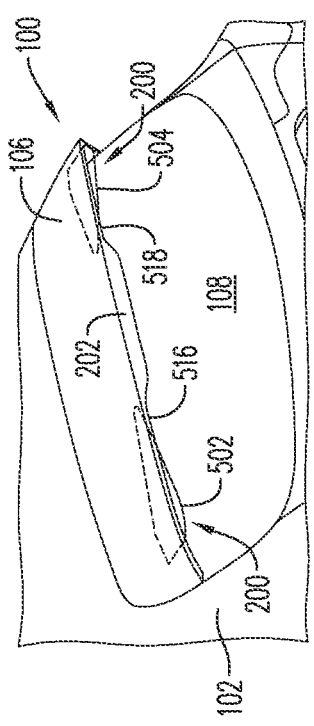
FIG. 9A is a representative view of an alternate embodiment of a deployable active D-pillar spoiler transitioning between a retracted position to a deployed position in accordance with aspects of the present disclosure.
Figure 9B:
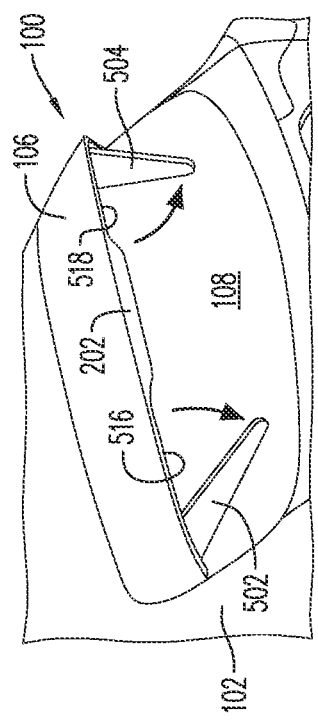
FIG. 9B is a representative view of the alternate embodiment of a deployable active D-pillar spoiler in the process of transitioning between a retracted position to a deployed position in accordance with aspects of the present disclosure.
Figure 9C:
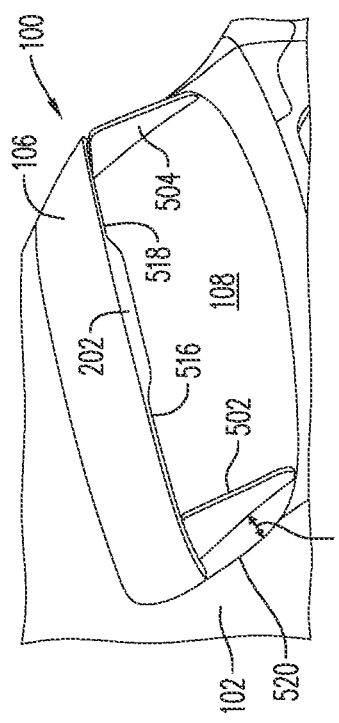
FIG. 9C is a representative view of the alternate embodiment of a deployable active D-pillar spoiler that has transitioned from a retracted position to a deployed position in accordance with aspects of the present disclosure.

In some embodiments, an underside of the rear upper spoiler, for example, underside 202 of rear upper spoiler 106, may include corresponding recesses on either side that are configured to receive each D-pillar spoiler in the retracted or stowed position. Referring now to FIGS. 9A-9C, views of example embodiments of deployable active D-pillar spoilers being deployed from stowed positions within recesses in underside 202 of rear upper spoiler 106 are shown. FIG. 9A illustrates D-pillar spoilers 200 in a retracted or stowed position on underside 202 of rear upper spoiler 106. For example, D-pillar spoilers 200 may be in the retracted or stowed positions when vehicle 100 is parked or when moving at speeds less than the predetermined speed at which D-pillar spoilers are to be deployed.

In this embodiment, each individual D-pillar spoiler, including first D-pillar spoiler 502 on one side of vehicle 100 and second D-pillar spoiler 504 on the opposite side of vehicle 100, are folded approximately flat to underside 202 of rear upper spoiler 106 in their retracted or stowed positions within corresponding recesses on underside 202 of rear upper spoiler 106. For example, in this embodiment, first D-pillar spoiler 502 is located within a first recess 516 on underside 202 and second D-pillar spoiler 504 is located within a second recess 518 on underside 202. In an example embodiment, each recess (e.g., first recess 516 and second recess 518) has a shape and size that corresponds and/or conforms to the shape and size of the respective D-pillar spoiler. For example, first recess 516 has shape and size that corresponds to the size and shape of first D-pillar spoiler 502 and second recess 518 has a size and shape that corresponds to second D-pillar spoiler 504. With this arrangement, D-pillar spoilers 200, including first D-pillar spoiler 502 and second D-pillar spoiler 504, may be hidden or minimally visible when in the retracted or stowed position so as to provide aesthetically pleasing styling under parked and low speed conditions.

Next, FIG. 9B illustrates D-pillar spoilers 200, including first D-pillar spoiler 502 and second D-pillar spoiler 504, in an intermediate position between the retracted or stowed position of FIG. 9A and a fully deployed position shown in FIG. 9C. For example, once vehicle 100 reaches a deployment condition, which may be based on a predetermined speed, as well as other factors, as will be described below, each of first D-pillar spoiler 502 and second D-pillar spoiler 504 are instructed to deploy from the retracted or stowed positions within corresponding recesses 516, 518 to the deployed positions. In an example embodiment, first D-pillar spoiler 502 and second D-pillar spoiler 504 rotate or pivot outward from within corresponding recesses 516, 518 on underside 202 of rear upper spoiler 106 towards open area 110 formed between rear upper spoiler 106 and D pillar 102. As shown in FIG. 9B, first D-pillar spoiler 502 and second D-pillar spoiler 504 are illustrated rotating or pivoting from the retracted or stowed position to the deployed position.

FIG. 9C illustrates D-pillar spoilers 200, including first D-pillar spoiler 502 and second D-pillar spoiler 504, in their deployed positions on either side of vehicle 100. In this embodiment, each of first D-pillar spoiler 502 and second D-pillar spoiler 504 has been rotated or pivoted by a deployment mechanism (described below) that transitions each D-pillar spoiler from within corresponding recesses 516, 518 on underside 202 of rear upper spoiler 106 to an upright position filling in open area 110 on either side of vehicle 100. In an example embodiment, first D-pillar spoiler 502 and second D-pillar spoiler 504 in the deployed positions are spaced from an edge 520 of rear window 108. For example, as shown in FIG. 9C, first D-pillar spoiler 502 is spaced apart by a first distance D1 from edge 520 of rear window 108. With this arrangement, D-pillar spoilers 200, including first D-pillar spoiler 502 and second D-pillar spoiler 504, provide improved aerodynamic performance to vehicle 100 in their deployed positions.

Referring now to FIG. 10, a cross-section view of first D-pillar spoiler 502 on one side of vehicle 100 is shown in the deployed position. In the deployed position, a bottom edge 522 of first D-pillar spoiler 502 is disposed adjacent to D pillar 102 and/or rear window 108. In some embodiments, a gap 524 may present at the interface between bottom edge 522 of first D-pillar spoiler 502 and the outer surface of D pillar 102 and/or rear window 108. In different embodiments, gap 524 may vary based on aerodynamic optimization for a particular vehicle and may be in a range between 0 mm to 10 mm.

Additionally, in some cases, the size of gap 524 may not be uniform and may vary along the length of bottom edge 522 between 0 mm to 10 mm. In one embodiment, a seal or gasket 526 may be provided along bottom edge 522 of first D-pillar spoiler 502 so as to fill in gap 524. In some embodiments, seal 526 may be made of a flexible material, such as silicone or rubber, to allow seal 526 to flex and fill in variations in the size of gap 524 along the length of bottom edge 522 of first D-pillar spoiler 502. With this arrangement, first D-pillar spoiler 502 may be sealed at the interface of the outer surface of D pillar 102 and/or rear window 108 to prevent or minimize any airflow at the interface to improve or optimize aerodynamics of vehicle 100.

In some embodiments, vehicle 100 may include a pair of deployment mechanisms for D-pillar spoilers contained within rear upper spoiler 106 of vehicle 100. Referring now to FIGS. 11 and 12, in this embodiment, a pair of deployment mechanisms include a first deployment mechanism 600, as described above, on one side of vehicle 100 and a second deployment mechanism 620 on the opposite side of vehicle 100 that is substantially similar to first deployment mechanism 600. In an example embodiment, each of first deployment mechanism 600 and second deployment mechanism 620 are contained within the body of rear upper spoiler 106 of vehicle 100. In other embodiments, first deployment mechanism 600 and second deployment mechanism 620 may be contained within a portion of a tailgate assembly of vehicle 100. With this arrangement, first deployment mechanism 600 is configured to rotate first D-pillar spoiler 502 from the stowed position shown in FIG. 11 to the deployed position shown in FIG. 12. Similarly, second deployment mechanism 620 is configured to rotate second D-pillar spoiler 504 from the stowed position shown in FIG. 11 to the deployed position shown in FIG. 12.

Referring now to FIG. 13, an example embodiment of a deployment mechanism, for example, first deployment mechanism 600, is shown in detail. In this embodiment, first deployment mechanism 600 includes electric motor 604, described above, that is controlled by a controller 1300 to operate electric motor 604 to rotate or turn linkage 606 to cause the D-pillar spoilers to rotate between the stowed position and the deployed position. In an example embodiment, controller 1300 may include at least a processor and controller logic configured to implement instructions to control electric motor 604. In this embodiment, electric motor 604 is coupled to a first set of gears 1302 that are in contact with (e.g., enmeshed with) a second set of gears 1304 connected to linkage 606. With this arrangement, rotation of first set of gears 1302 by electric motor 604 turns second set of gears 1304 which rotate linkage 606 to rotate or turn the D-pillar spoiler attached to linkage 606. In this embodiment, first deployment mechanism 600 has a compact form contained within a housing 1306 that is sized and dimensioned to fit inside the body of rear upper spoiler 106 of vehicle 100 and/or a portion of a tailgate assembly of vehicle 100.

Figure 14:
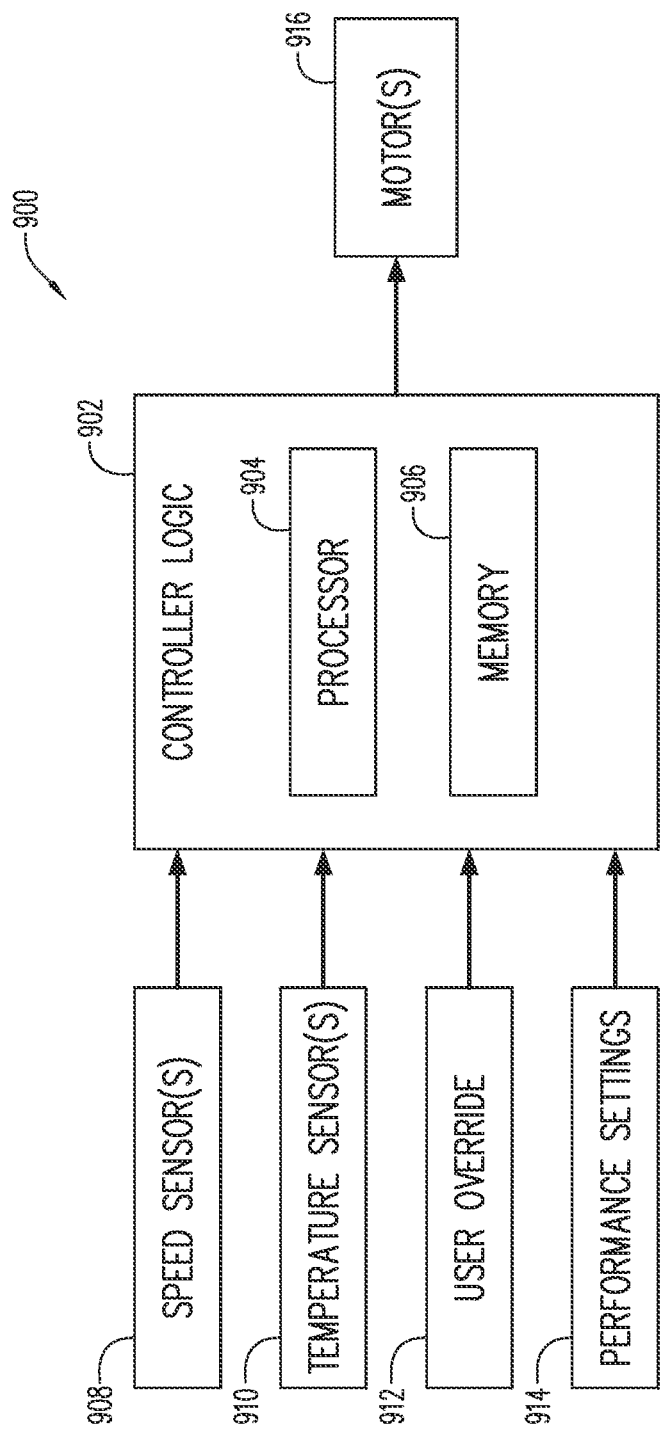
FIG. 14 is a block diagram of an example embodiment of a deployment control system including controller logic for controlling deployment of a deployable active D-pillar spoiler in accordance with aspects of the present disclosure.

In some embodiments, the deployable active D-pillar spoilers of the present embodiments may be controlled between the retracted or stowed position and the deployed position using a deployment control system. Referring now to FIG. 14, a block diagram of an example embodiment of a deployment control system 900 is shown. In some embodiments, deployment control system 900 may be installed or implemented in a vehicle (e.g., vehicle 100, described above) to control actuation of the deployable active D-pillar spoilers (e.g., D-pillar spoilers 200, described above) between the retracted or stowed position and the deployed position. For example, in an example embodiment, deployment control system 900 may be part of, or in communication with, other systems in the vehicle, such as an engine control unit (ECU) or other control systems for the vehicle. In one embodiment, deployment control system 900 includes at least a controller logic 902 comprising at least one processor 904 and a memory 906 for storing instructions for implementing deployment and/or retraction of the D-pillar spoilers.

In some embodiments, controller logic 902 may receive one or more inputs from various sources within the vehicle (e.g., vehicle 100) that may be used to detect a deployment condition for sending an instruction to deploy the deployable active D-pillar spoilers (e.g., D-pillar spoilers 200), as well as detecting a retraction condition for sending an instruction to retract the D-pillar spoilers. In an example embodiment, the inputs to controller logic 902 may include, but are not limited to: one or more speed sensors 908 configured to detect and/or determine a speed of the vehicle (e.g., wheel speed sensors, global positioning system (GPS) sensors, or other sensors typically included on a vehicle that detect or determine a travel speed of the vehicle), one or more temperature sensors 910 configured to detect or measure an ambient temperature outside of the vehicle, a user override input 912 configured to allow a user to manually control deployment and/or retraction of the D-pillar spoilers, and/or inputs from performance settings 914 associated with the vehicle. For example, performance settings 914 may include options for a sport or performance mode that prioritizes vehicle performance (such as speed or acceleration) or an economy mode that prioritizes fuel efficiency or energy/battery consumption. Controller logic 902 may also receive inputs from other vehicle sensors, such as a rain or precipitation sensor or a side wind sensor.

In an example embodiment, controller logic 902 receives inputs from one or more of speed sensors 908, temperature sensors 910, user override 912, and/or performance settings 914 and. based on the inputs, determines whether to send an instruction to one or more motors 916 of a deployment mechanism (e.g., motor 604 of deployment mechanism 600, described above) to deploy or retract the D-pillar spoilers. For example, controller logic 902 may use the received inputs to determine whether a deployment condition or a retraction condition has been met based on predetermined criteria stored in memory 906. In one embodiment, the deployment condition may be a predetermined speed of the vehicle. In other embodiments, the deployment condition may be a combination of a predetermined speed and other inputs, such as temperature (from temperature sensor 910) and/or performance mode (from performance settings 914). In one embodiment, the retraction condition may be a predetermined speed of the vehicle, for example, the same predetermined speed as the deployment condition or a different predetermined speed that is lower than the predetermined speed used for the deployment condition. In other embodiments, the retraction condition may be a combination of the predetermined speed and other inputs such as temperature (from temperature sensor 910) and/or performance mode (from performance settings 914).

In some embodiments, a user (e.g., the driver of vehicle 100) may manually instruct controller logic 902 to send an instruction to motor 916 to deploy or retract the D-pillar spoilers via user override 912. That is, an input received from user override 912 may be configured to satisfy a deployment condition or a retraction condition that causes controller logic 902 to send the corresponding instruction to motor 916 to deploy or retract the D-pillar spoilers. With this arrangement, a user may have manual control over whether the D-pillar spoilers are in the retracted or stowed position or the deployed condition.

Referring now to FIG. 15, a flowchart of an example embodiment of a method 1000 for controlling deployment of deployable active D-pillar spoilers in accordance with aspects of the present disclosure is shown. In some embodiments, method 1000 may be implemented by at least one processor in a vehicle, such as processor 904 of controller logic 902, described above. In an example embodiment, method 1000 may begin at an operation 1002. At operation 1002, one or more inputs from vehicle sensors are received at the processor. For example, in one embodiment one or more inputs from speed sensors 908, temperature sensor 910, user override 912, and/or performance settings 914 may be received at processor 904 of controller logic 902.

Next, method 1000 includes an operation 1004. At operation 1004, a deployment condition is detected. As described above, in an example embodiment, the deployment condition may be detected based on a predetermined speed of the vehicle. For example, when the vehicle speed (e.g., received from speed sensors 908) is equal to or greater than the predetermined speed, then the deployment condition may be detected at operation 1004. In one embodiment, the predetermined speed for the deployment condition may be 45 miles per hour. In different embodiments, the predetermined speed for the deployment condition may be set at a higher or lower speed.

In other embodiments, the deployment condition detected at operation 1004 may include other inputs in combination with the predetermined speed. In one embodiment, an ambient temperature received from temperature sensor 910 and/or a presence of rain or precipitation from a rain or precipitation sensors may be used in combination with the predetermined speed to determine the deployment condition. For example, the deployment condition may include a minimum ambient temperature in addition to the predetermined speed so that the D-pillar spoilers are not deployed in conditions where ice or freezing rain may cause damage to the D-pillar spoilers or the deployment mechanism. That is, deployment of the D-pillar spoilers (i.e., via instruction sent to the motor) is prohibited when the ambient temperature is below the minimum ambient temperature.

In other embodiments, the deployment condition may be based on other inputs. For example, an input from user override 912 to manually deploy the D-pillar spoilers may be the deployment condition detected at operation 1004. In another embodiment, an input from performance settings 914 may be used to adjust the predetermined speed at which the D-pillar spoilers are deployed. For example, in a performance mode, the predetermined speed for deploying the D-pillar spoilers may be lower than in other modes so that the best aerodynamic performance is achieved. Similarly, in an economy mode, the predetermined speed for deploying the D-pillar spoilers may be chosen to provide better fuel economy than in other modes. Other factors for detecting a deployment condition may also be provided at operation 1004.

Next, once the deployment condition is detected at operation 1004, method 1000 proceeds to an operation 1006. At operation 1006 the motor or motors are instructed to deploy the D-pillar spoilers. For example, at operation 1006, processor 904 of controller logic 902 may send an instruction to motor 916 of the deployment mechanism (e.g., motor 604 of deployment mechanism 600) to pivot or rotate D-pillar spoilers 200 from the retracted or stowed position to the deployed position, as shown in FIGS. 5A-5C or FIGS. 9A-9C above.

In some embodiments, after deployment of the D-pillar spoilers at operation 1006, method 1000 may (optionally) further include additional operations configured to determine when to retract the D-pillar spoilers. For example, in this embodiment, method 1000 includes an operation 1008 where one or more vehicle sensors are monitored by the processor. In one embodiment, sensors monitored at operation 1008 may include any of the vehicle sensors previously described, including, but not limited to speed sensors 908, temperature sensor 910, user override 912, and/or performance settings 914.

Next, at an operation 1010, a retraction condition is detected. For example, in one embodiment, the retraction condition may be detected based on a predetermined speed of the vehicle. For example, when the vehicle speed (e.g., received from speed sensors 908) is less than a predetermined speed, then the retraction condition may be detected at operation 1010. In some cases, the predetermined speed for the retraction condition may be the same as the predetermined speed for the deployment condition. In other embodiments, the predetermined speed for the retraction condition may be different than the predetermined speed for the deployment condition. For example, in one embodiment, the predetermined speed for the retraction condition may be lower than the predetermined speed for the deployment condition. In one embodiment, for example, the predetermined speed for the deployment condition may be 45 miles per hour and the predetermined speed for the retraction condition may be 30 miles per hour. With this arrangement, by setting the predetermined speed for the retraction condition to be lower than the predetermined speed for the deployment condition, a situation where the D-pillar spoilers are repeatedly deployed and retracted as the vehicle speed fluctuates may be avoided.

In other embodiments, the retraction condition detected at operation 1010 may include other inputs in combination with the predetermined speed. Additionally, as with the deployment condition, an input received from user override 912 may manually trigger the retraction condition at operation 1010 so that the user can control whether or not the D-pillar spoilers are retracted or deployed.

In response to detection of the retraction condition at operation 1010, method 1000 includes an operation 1012. At operation 1012, the motor or motors are instructed to retract or stow the D-pillar spoilers. For example, at operation 1012, processor 904 of controller logic 902 may send an instruction to motor 916 of the deployment mechanism (e.g., motor 604 of deployment mechanism 600) to pivot or rotate D-pillar spoilers 200 from the deployed position to the retracted or stowed position, in reverse of the order shown in FIGS. 5A-5C or FIGS. 9A-9C above. That is, each D-pillar spoiler 200 is pivoted or rotated from the deployed position back to the retracted or stowed position underneath rear upper spoiler 106 of vehicle 100.

With this arrangement, the deployable active D-pillar spoilers according to the example embodiments described herein are deployed while the vehicle is moving at a predetermined speed to improve aerodynamic performance and are retracted or stowed when the vehicle is parked or operating at low speeds to improve styling appearance.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A rear spoiler for a vehicle comprising:
   a spoiler body including a first end on one side of the vehicle and a second end on an opposite side of the vehicle, wherein the spoiler body is positioned at a rearward end of the vehicle with the first end positioned adjacent to a first rear pillar of the vehicle and the second end positioned adjacent to a second rear pillar of the vehicle;
   an underside of the spoiler body extending between the first end and the second end;
   at least one active spoiler disposed beneath the spoiler body, the at least one active spoiler movable between a stowed position and a deployed position;
   wherein, in the stowed position, the at least one active spoiler is disposed adjacent to the underside of the spoiler body; and
   wherein, in the deployed position, a first end of the at least one active spoiler is positioned adjacent to the first end of the spoiler body and a second end of the at least one active spoiler extends downwards from the spoiler body.

2. The rear spoiler according to claim 1, wherein the at least one active spoiler is configured to rotate between the stowed position and the deployed position.

3. The rear spoiler according to claim 1, wherein the spoiler body is fixed to the vehicle.

4. The rear spoiler according to claim 1, wherein the at least one active spoiler is flush along the underside of the spoiler body in the stowed position.

5. The rear spoiler according to claim 1, wherein the underside of the spoiler body further comprises a recess configured to receive the at least one active spoiler in the stowed position.

6. A system for deploying D-pillar spoilers on a vehicle, the system comprising:

a deployment control system comprising controller logic including at least one processor and a memory storing instructions for implementing deployment and/or retraction of one or more D-pillar spoilers on a vehicle;

a vehicle input in communication with the deployment control system;

a motor in communication with the deployment control system; and at least one D-pillar spoiler connected to the motor through a linkage, the motor configured to move the linkage;

wherein the at least one D-pillar spoiler is folded along an underside of a rear upper spoiler of the vehicle in a retracted position and wherein the at least one D-pillar spoiler is moved to a position extending between the rear upper spoiler of the vehicle and a D-pillar of the vehicle in a deployed position.

7. The system according to claim 6, wherein the at least one D-pillar spoiler is connected to the linkage by a support member.

8. The system according to claim 7, wherein the support member is attached to the linkage at one end; and
wherein one side of the support member is attached to an inner surface of the at least one D-pillar spoiler along a length of the support member.

9. The system according to claim 6, wherein the vehicle input is a vehicle sensor comprising one of a wheel speed sensor, global positioning sensor, temperature sensor, rain sensor, precipitation sensor, and wind sensor.

10. The system according to claim 9, wherein the deployment control system is configured to send an instruction to the motor to move the linkage in a first direction to deploy the at least one D-pillar spoiler from the retracted position to the deployed position in response to a deployment condition wherein a speed of the vehicle as detected by the vehicle sensor is greater than or equal to a first predetermined speed.

11. The system according to claim 6, wherein the vehicle input is a manual user override.

12. The system according to claim 9, wherein the deployment control system is configured to send an instruction to the motor to move the linkage in a second direction that is opposite of the first direction to retract the at least one D-pillar spoiler from the deployed position to the retracted position underneath the rear upper spoiler of the vehicle in response to a retraction condition.

13. The system according to claim 12, wherein the retraction condition is a second predetermined speed of the vehicle; and
wherein the instruction is sent to the motor to move the linkage in the second direction when a speed of the vehicle detected by the vehicle speed sensor is less than the second predetermined speed.

14. The system according to claim 6, wherein the motor is located adjacent an upper portion of a rearward end of the vehicle.

15. An apparatus for deploying a D-pillar spoiler of a vehicle comprising:

a motor;

a linkage connected to the motor such that the motor is configured to move the linkage in a first direction and a second direction that is opposite the first direction;

at least one support member attached to the linkage at one end; and a D-pillar spoiler connected to the at least one support member along an inner surface of the D-pillar spoiler; and wherein the D-pillar spoiler is folded along an underside of a rear upper spoiler of the vehicle in a retracted position and wherein the D-pillar spoiler is moved by the motor to a position extending between the rear upper spoiler of the vehicle and a D pillar of the vehicle in a deployed position.

16. The apparatus according to claim 15, wherein the D-pillar spoiler has a triangular shape.

17. The apparatus according to claim 16, wherein the triangular shape of the D-pillar spoiler is defined by:

a top edge that is configured to extend along a bottom edge of the underside of rear upper spoiler;

a bottom edge that is configured extend along a trailing edge of a D pillar of the vehicle; and a rear edge that extends from the underside of the rear upper spoiler towards the trailing edge of the D pillar of the vehicle.

18. The apparatus according to claim 15, wherein the motor is located adjacent an upper portion of a rearward end of the vehicle.

19. The apparatus according to claim 15, wherein the D-pillar spoiler is a first D-pillar spoiler associated with one side of the vehicle;
further comprising a second D-pillar spoiler associated with an opposite side of the vehicle from the first side.

20. The apparatus according to claim 19, wherein the motor is configured to move the first D-pillar spoiler and the second D-pillar spoiler.

* * * * *